United States Patent [19]

Kimura et al.

[11] Patent Number: 4,931,963

[45] Date of Patent: Jun. 5, 1990

[54] SELF-DIAGNOSIS METHOD FOR A BANK NOTE DEPOSITING AND DISPENSING MACHINE

[75] Inventors: Haruo Kimura; Minematsu Nobuo; Suto Shin-ichi, all of Tokyo, Japan

[73] Assignee: Oki Electric Industry Co., Ltd., Tokyo, Japan

[21] Appl. No.: 229,731

[22] Filed: Aug. 3, 1988

Related U.S. Application Data

[63] Continuation-in-part of Ser. No. 932,569, Nov. 20, 1986, abandoned.

[30] Foreign Application Priority Data

Nov. 22, 1985 [JP] Japan ............................... 60-261490
Nov. 22, 1985 [JP] Japan ............................... 60-261491

[51] Int. Cl.[5] ............................................ G06F 15/20

[52] U.S. Cl. ............................. 364/551.01; 364/471; 364/479; 364/408; 377/8; 377/11; 377/14; 235/376

[58] Field of Search ................... 364/550, 551.01, 555, 364/471, 469, 478, 479, 401, 406, 408; 377/6-8, 10, 11, 13-16; 235/375-377, 379; 356/373, 375; 340/673, 675

[56] References Cited

U.S. PATENT DOCUMENTS 3,845,288 10/1974 Cornyn et al. ................ 235/151.34
3,893,175 7/1975 Soloman ................................ 360/6
4,133,477 1/1979 Marino et al. ...................... 235/304
4,215,412 7/1980 Bernier et al. ...................... 364/551
4,504,916 3/1985 Oka ........................................ 377/8
4,531,193 7/1985 Yasuhara et al. ................... 364/551
4,536,849 8/1985 Borisch et al. ..................... 364/550
4,545,031 10/1985 Kabayashi .......................... 364/471
4,602,332 7/1986 Hirose et al. ........................ 364/408
4,608,704 8/1986 Sherman, III et al. ................. 377/8
4,635,214 1/1987 Kasai et al. ......................... 364/551
4,654,806 8/1987 Poyser et al. ....................... 364/551
4,695,965 9/1987 Fujita et al. ......................... 364/518

FOREIGN PATENT DOCUMENTS 0023879 4/1980 European Pat. Off. .
2823558 12/1979 Fed. Rep. of Germany .
3304052 9/1983 Fed. Rep. of Germany .
59-142857 9/1984 Japan .
59-153290 9/1984 Japan .

OTHER PUBLICATIONS

IBM Technical Disclosure Bulletin, vol. 26, No. 10A, Mar. 1984, T. W. Gallman and G. Krysiuk, "Automatic Operator Notification of Sensor Performance Degradation".

IBM Technical Disclosure Bulletin, vol. 24, No. 7A, Dec. 1981, J. H. Dodge, L. M. Ernstand, W. E. McCollum, "Self-Analysis of Copier Electronics".

*Primary Examiner*—Parshotam S. Lall
*Assistant Examiner*—Brian M. Mattson
*Attorney, Agent, or Firm*—Wenderoth, Lind & Ponack

[57] ABSTRACT

Diagnosis data for respective portions of an apparatus are collected from respective sensors provided on the apparatus at the respective portions thereof and stored in a memory for each of the respective portions. These diagnosis data are the amount of change with time and frequency of occurrence of abnormal operation. The amount of change with time is yielded from the number of treatments for a detection object of each sensor, while the frequency of occurrence of abnormal operations is provided as a ratio of the number of anbormal operations detected by the respective sensors to the number of treatments by the particular object or part involved. The resulting diagnosis data is compared with a predetermined reference value, and when the diagnosis data exceeds the reference value, a prediction alarm flag indicative of a prediction of necessary maintencance to prevent trouble from occuring is added to the diagnosis data and stored in the memory.

16 Claims, 14 Drawing Sheets

FIG.9

| ADDRESS | MEMORY DATA |
|---|---|
| N1 | SENSOR 10A-AMOUNT OF TIME CHANGE P($n$) |
| N2 | SENSOR 10B-AMOUNT OF TIME CHANGE P($n$) |
| N3 | SENSOR 10C-AMOUNT OF TIME CHANGE P($n$) |
| N4 | SENSOR 10D-AMOUNT OF TIME CHANGE P($n$) |
| N5 | SENSOR 10E-AMOUNT OF TIME CHANGE P($n$) |
| N6 | SENSOR 10F-AMOUNT OF TIME CHANGE P($n$) |
| N7 | SENSOR 10G-AMOUNT OF TIME CHANGE P($n$) |
| N8 | SENSOR 10H-AMOUNT OF TIME CHANGE P($n$) |
| N9 | SENSOR 10I-AMOUNT OF TIME CHANGE P($n$) |
| N10 | SENSOR 10J-AMOUNT OF TIME CHANGE P($n$) |
| N11 | SENSOR 10A-FREQUENCY OF OCCURRENCE OF SLANTED FEED |
| N12 | SENSOR 10H-FREQUENCY OF OCCURRENCE OF SLANTED FEED |
| N13 | SENSOR 10I-FREQUENCY OF OCCURRENCE OF SLANTED FEED |
| N14 | SENSOR 10J-FREQUENCY OF OCCURRENCE OF SLANTED FEED |
| N15 | SENSOR 10A-FREQUENCY OF OCCURRENCE OF OVERLAPPED FEED |
| N16 | SENSOR 10H-FREQUENCY OF OCCURRENCE OF OVERLAPPED FEED |
| N17 | SENSOR 10I-FREQUENCY OF OCCURRENCE OF OVERLAPPED FEED |
| N18 | SENSOR 10J-FREQUENCY OF OCCURRENCE OF OVERLAPPED FEED |
| N19 | SENSOR 10A-LEVEL |
| N20 | SENSOR 10B-LEVEL |
| N21 | SENSOR 10C-LEVEL |
| N22 | SENSOR 10D-LEVEL |
| N23 | SENSOR 10E-LEVEL |
| N24 | SENSOR 10F-LEVEL |
| N25 | SENSOR 10G-LEVEL |
| N26 | SENSOR 10H-LEVEL |
| N27 | SENSOR 10I-LEVEL |
| N28 | SENSOR 10J-LEVEL |
| N29 | RATE OF REJECTION |

SELF-DIAGNOSIS METHOD FOR A BANK NOTE DEPOSITING AND DISPENSING MACHINE

This application is a continuation-in-part, of now abandoned application Ser. No. 932,569, filed Nov. 20, 1986 now abandoned.

BACKGROUND OF THE INVENTION

1. Field of the Invention:

The present invention relates to a self-diagnosis method and apparatus for automatically diagnosing the operating state of a bank note depositing and dispensing machine thereby predicting the occurrence of any trouble in need of maintenance for preventing it in advance, and more particularly to such a self-diagnosis method and apparatus suitable for the application to an automatic transaction apparatus.

2. Description of the Prior Art:

Conventionally, this type of apparatus has been maintained by breakdown maintenance. Namely, when any malfunction was produced in the apparatus, a defective portion was retrieved and repaired, or parts thereof were exchanged. Such maintenance will here be described with regard to a bank note depositing and dispensing machine of an automatic transaction apparatus. The bank note depositing and dispensing machine has depositing functions of separating deposited bank notes one by one, judging at a bank note judgement unit whether or not the bank note concerned is genuine and discriminating the denomination of the bank note, and furthermore housing such bank note in a corresponding bank note housing part. Such machine also has a dispensing function of dispensing bank notes in the opposite direction to the depositing position. Such a bank note depositing and dispensing machine is likely to produce malfunctions such as jamming, incorrect discrimination and the like due to slanted and overlapped feed of bank notes and abnormal sensors serving to discriminate the bank notes. The slanted and overlapped feed of bank notes may sometimes be caused by wear and improper adjustment of a separation roller, and abnormal judgement by the sensor may be produced because of change thereof with time and adhesion of dust thereto. The prior maintenance procedure eliminates such troubles only upon occurrence thereof.

It is, however, of course, undesirable to have the operating efficiency and reliability of the apparatus limited to such extent. For example, when an automatic transaction apparatus in the banking system is stopped for maintenance whenever any trouble is produced, this not only is undesirable relative to service to customers, but also brings about insufficient operating efficiency and reliability to the banking organization.

SUMMARY OF THE INVENTION

In view of the drawbacks of the prior methods, it is an object of the present invention to improve the operating efficiency and reliability of apparatus such as an automatic transaction apparatus.

Another object of the present invention is to eliminate the causes of any trouble produced in an apparatus before the apparatus actually malfunctions and is damaged.

Still another object of the present invention is to predict the occurrence of any trouble in need of maintenance in advance.

To achieve the above objects, the self-diagnosis method and apparatus of the present invention collects data for diagnosing the operating state of an apparatus for each desired portion thereof and stores them in a memory. As such diagnosis data, any change of the apparatus with the passage of time and the frequency of occurrence of abnormal operations are employed. The data collected are compared with predetermined reference values for respective portions of the apparatus. When the diagnosis data exceeds the reference value in such comparison, a prediction alarm is generated to indicate that there is a danger of the occurrence of trouble in need of maintenance on the portion concerned, and the prediction alarm is displayed.

The above and other objects, features and advantages of the present invention will become more apparent from the following description when taken in conjunction with the accompanying drawings in which preferred embodiments of the present invention are shown by way of illustrative examples.

BRIEF DESCRIPTION OF THE DRAWINGS

FIGS. 5, 5*a*-1, 5*1*-2, 5*a*-3 and 5*b* are flowcharts illustrating an operating procedure of another embodiment of the present invention;

FIGS. 6, 6*a* and 6*b* together form a flowchart illustrating operating procedure of a still another embodiment of the present invention;

FIGS. 7, 7*a* and 7*b* together form a block diagram illustrating the hardware arrangement of the another embodiment of the present invention;

FIG. 9 is a chart showing a storage formal of data according to the invention.

DESCRIPTION OF THE PREFERRED EMBODIMENTS

Figure 1:
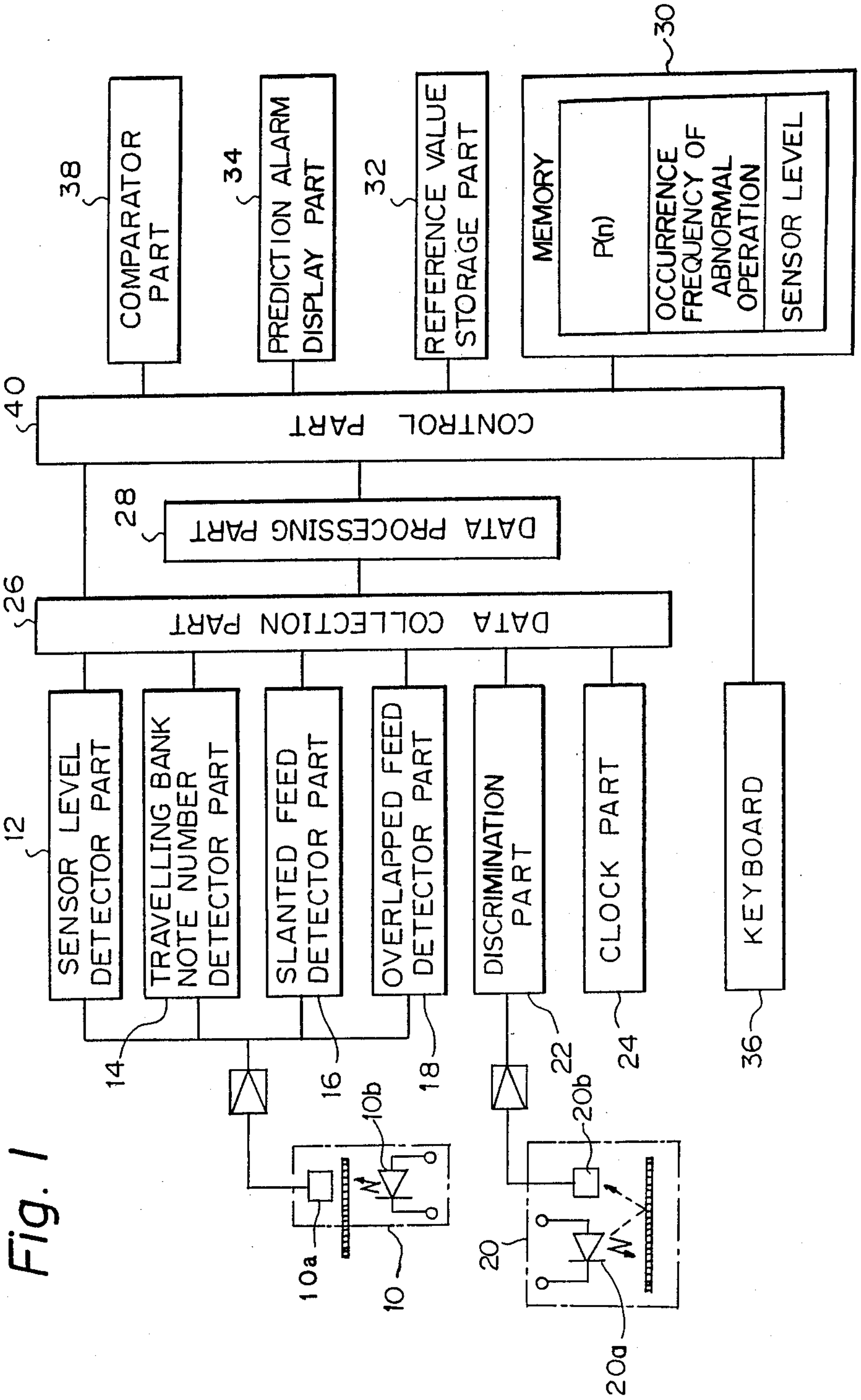
FIG. 1 is a block diagram illustrating the hardware arrangement in applying a self-diagnosis method for an apparatus according to the present invention to an automatic bank note depositing and dispensing machine.

First, the principle of the self-diagnosis method of the present invention will be described, employing a bank note depositing and dispensing machine included in an automatic transaction apparatus as an example.

The bank note depositing and dispensing machine has, as described above and as will be discussed in more detail below, rollers for feeding bank notes, separation rollers for separating a plurality of bank notes one at a time, and other constituent members. These parts (or units) may cause errors in operation, such as slanted feed and overlapped feed of bank notes due to wear of the rollers with elapsed time, as well as misalignment with the passage of time, and the like, and hence may cause operating problems such as jamming, etc.

Accordingly, the self-diagnosis method and apparatus of the present invention are adapted to diagnose at all times the operating state of the apparatus by determining the change of the apparatus with the passage of time and the frequency of occurrence of abnormal operations such as slanted feed and overlapped feed of bank notes and by predicting the occurrence of non-allowable operating difficulties in the apparatus, i.e. the occurrence of a state of the apparatus in need of maintenance to prevent such operating difficulties from being produced.

First, maintenance necessary due to the change of the apparatus with the passage of time, i.e. maintenance due to the changes of parts and units constituting the apparatus with the passage of time, will be described. The amount of change of parts and units with the passage of time can previously be determined experimentally. For example, for a roller the amount of change thereof with time corresponds to the degree of wear of the roller. But, it is unnecessary to directly know the degree of wear of the roller as the amount of change thereof with time. Thus, the amount of change of the roller with time can be obtained as a function of the number of bank notes treated by the roller. Accordingly, by previously knowing experimentally the degree of wear of the roller with respect to the number of bank notes treated by the roller, the life of the roller (i.e. the time when exchange or maintenance of the roller is needed) can be predicted. That is, the number of bank notes treated by a roller from the time of start of operation until the roller expires (i.e. no longer is useful) can be observed or determined. By comparing this previously known experimental value with the number of bank notes treated by another similar roller, it is possible to predict when such similar roller will expire and require maintenance. It is however undesirable to make such determination that will require actual maintenance, i.e. to employ the number of bank notes treated until the roller has actually expired as the reference number for comparison. Therefore, it is preferable to employ as the reference a number less than the number of treated bank notes resulting in expiration of the roller (i.e. a number of bank notes treated by the roller wherein the roller still is capable of effecting normal feed before it has expired).

As described above, the self-diagnosis method of the present invention is adapted to compare the amount of the change of the apparatus with the passage of time until a particular point in time with the predetermined amount of change thereof capable of serving as a reference value and indicative of when maintenance will be needed and to warn (prediction alarm) an operator when the former exceeds the latter. This prediction alarm is displayed every day of routine inspection for maintenance (e.g. every four months).

The principle of the present invention described above can be expressed by a numerical formula as follows: The amount of change per unit time of parts or a unit (e.g. the above roller) with the passage of time is now assumed to be Q(n). The unit time is selected, for example, as a number of days, a number of weeks, or a number of months, and in this example of number of months is employed. Namely, Q(1) is the amount of change of the parts or unit with the passage of time at a month after starting the operation of the parts or unit, and Q(2) is that during the next one month, etc. When a portion of the apparatus is defective, e.g. at n months after starting the operation of the apparatus (e.g. when a non-allowable problem is caused due to wear of the roller), the amount Q(n) of change of the parts or unit with the passage of time can be expressed as follows:

$$\sum_{n=1}^{nx} Q(n). \tag{1}$$

The reference value for comparison is assumed to be a fixed quantity, with a built-in safety factor or time to spare equal to a period T for routine inspection with respect to a fixed value Q(n) until the apparatus is in need of repair. Thus, the reference value is expressible as follows:

$$\sum_{n=1}^{(nx-T)} Q(n). \tag{2}$$

On the other hand, the accumulated amount P(n) of change of the parts or unit in the apparatus that is operating with the passage of time at n months after starting the operation of the apparatus is expressible as follows, taking the number (n) months as a parameter:

$$\sum_{n=1}^{n} P(n). \tag{3}$$

Accordingly, conditions to generate the prediction alarm can be expressed as follows:

$$\sum_{n=1}^{n} P(n) = \sum_{n=1}^{(nx-T)} Q(n). \tag{4}$$

Figure 2:
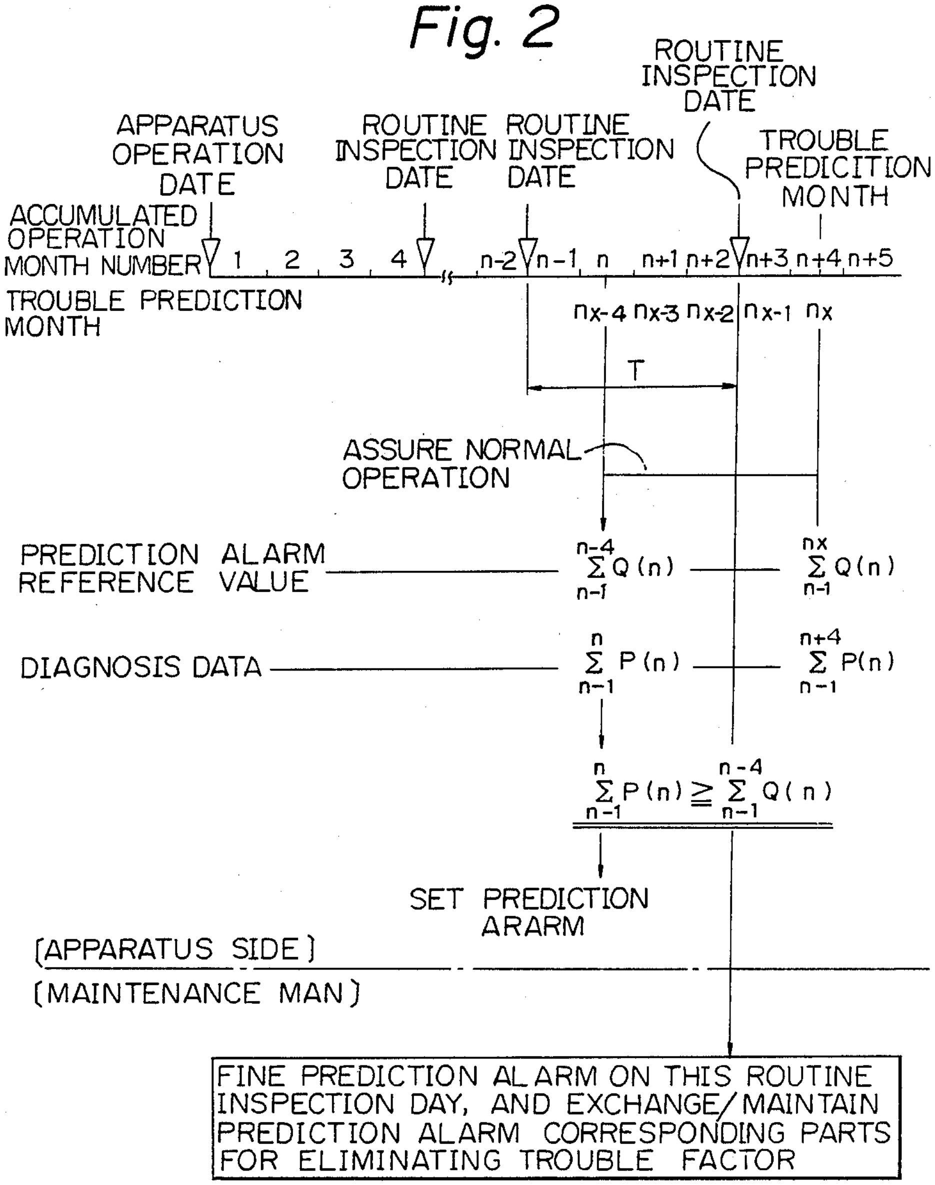
FIG. 2 is a graph illustrating the self-diagnosis method of the present invention in a time series manner.

FIG. 2 is a graph illustrating in a time series manner the maintenance described above by the self-diagnosis apparatus and method of the present invention. In this example, T=4 is assumed in the equation (2) i.e. the period for routine inspection is assumed to be four months. In the same figure, since the breakdown of certain parts or a certain unit is expected as being produced when the amount of change of the apparatus with the passage of time is given by $$\sum_{n=1}^{nx} Q(n),$$

the reference value for comparison is set as satisfying $$\sum_{n=1}^{nx-4} Q(n) = \sum_{n=1}^{n-4} Q(n)$$

with the assumption of T=4. Here, the amount of change of the apparatus with the passage of time $$\sum_{n=1}^{n} P(n)$$

experimentally measured with n months pass after starting the operation of the apparatus is compared with the reference value $$\sum_{n=1}^{n-4} Q(n),$$

whereby the prediction alarm is given when $$\sum_{n=1}^{n} P(n) \geqq \sum_{n=1}^{n-4} Q(n).$$

The prediction alarm is displayed at the first day of routine inspection n months later. A maintenance man looking at the prediction alarm performs the exchange of the parts or unit concerned, etc., thereby eliminating factors of potential breakdown. Moreover, since the reference value for comparison has time to spare by four months, the display of the prediction alarm may be left as it is until the first day of routine inspection without effecting exchange on the spot.

In succession, maintenance due to the frequency of occurrence of abnormal operation such as slanted feed and overlapped feed of bank notes will be described. Such abnormal operations are roughly divided into: those in need of maintenance by a maintenance man while stopping the apparatus concerned immediately after any abnormality is produced (referred to as a breakdown in the present description); those from which abnormal factors can simply be eliminated by an operator or a maintenance man; and those in need of maintenance depending on the frequency of occurrence such as slanted feed and overlapped feed of bank notes. Here, the latter two cases will be described as abnormal operation, since the purpose of the present invention is to predict the potential for occurrence of any breakdown. Therefore, the frequency of occurrence of abnormal operations is monitored, and when it exceeds an allowed level (reference value), a prediction alarm is set, which informs an operator of the fact that maintenance on those parts and units having the occurrence factor of abnormal operation is needed. Thereupon, the slanted and overlapped feeds are considered to be caused due to the apparatus itself or due to bad quality bank notes, but with the apparatus having no abnormality, and hence, the reference value is set taking this situation into consideration. In addition, the reference value is established to have time to spare to some extent. The frequency of occurrence of any abnormality can be monitored, for example, with regard to slanted feed as the number of slanted bank notes compared to the number of bank notes treated per day.

Figure 3A:
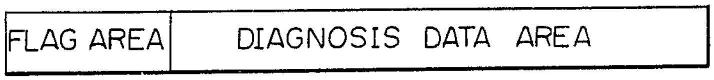
FIGS. 3*a* and 3*b* are charts exemplarily showing format of diagnosis data in the present invention.
Figure 3B:

In the following, the self-diagnosis method of the present invention will be described as being applicable to a bank note depositing and dispensing machine of an automatic transaction apparatus. FIG. 1 is a block diagram illustrating the hardware arrangement of this example. As shown in FIG. 1, the travelling sensor 10 comprises a light source 10*a* composed of an LED and the like, and an optical sensor 10*b* composed of a phototransistor and the like which receives light emitted from the light source 10*a*. A number of travelling sensors 10 are disposed along the travelling paths of the bank note. Designated at 12 is a sensor level detector part, which serves to detect the output level of an individual travelling sensor (optical sensor). The numeral 14 shows a travelling bank note number detector part that detects an output signal from an optical sensor located at a bank note separation/delivery part, i.e. a signal therefrom generated as it is turned off by the passage of any bank note therethrough. The numeral 16 shows a slanted feed detector part, which detects slanted feed of any bank note on the basis of an output signal from an optical sensor disposed in the vicinity of the travelling path to detect slanted feed and in the vicinity of a separation roller for separating bank notes one at a time. In particular, the optical sensor detects the slanted feed by detecting a time difference generated between output signals from two optical sensors separated from each other perpendicularly to the travelling direction of the bank note. The numeral 18 shows an overlapped feed detector part, which detects overlapped feed of bank notes on the basis of an output signal from an optical sensor serving to detect the thickness of bank notes when they travel. The numeral 20 is a judgement sensor, which provides a signal for judging whether or not a bank note concerned is genuine. The judgement sensor 20 comprises a light source 20*a* composed of an LED and the like and an optical sensor 20*b* which receives light emitted from the light source 20*a* through reflection on bank notes. The numeral 22 shows a discrimination part for discriminating the genuineness or the falseness of any bank note, a bad bank note (stained or damaged bank note), and the denomination of any bank note on the basis of an output signal from the judgement sensor 20. The numeral 24 shows a clock part for measuring time. The numeral 26 shows a data collection part for collecting output signals from the sensor level detector part 12, the travelling bank note detector part 14, the slanted feed detector part 16, the overlapped feed detector part 18, the discrimination part 22, and the clock part 24, and temporarily storing such collected signals. Namely, the data collection part 26 stores the amount of the change P(n) of any parts and unit with the passage of time within a prescribed time interval (e.g. within one month) (the amount of changes in the present embodiment denotes the number of bank notes treated for each part and unit such as a roller), including the output levels of the optical sensors, the number of travelling bank notes (the number of separated bank notes), the number of slanted bank notes, the number of overlapped bank notes, and the number of discriminated/rejected bank notes. The numeral 28 shows a data processing part for obtaining the frequency of occurrence of each of the signals provided from the slanted feed detector part 16, the overlapped feed detector part 18, and the discrimination part 22 via the data collection part 26 with use of an output signal from the travelling bank note number detector part 14 via the data collection part 26. For example, with regard to the slanted feed of bank notes, data processing part 28 evaluates, assuming that the number of slanted bank notes per day stored in the data collection part 26 is Ns and that the number of travelling bank notes (the number of separated bank notes) per day is Na, $Ns/Na \times 100$ for estimating the frequency of occurrence S of slanted bank notes (rate of slanted bank notes). Likewise, data processing part 28 also evaluates the occurrence frequency of overlapped bank notes (rate of overlapped bank notes) as well as the frequency of occurrence of discriminated/rejected bank notes (rate of rejection). The numeral 30 is a memory for storing the resulting diagnosed data. To be concrete, the memory 30 stores the number of treated bank notes $$\sum_{n=1}^{n} P(n)$$

yielded from the time of start of operation of the apparatus to the present time, which is provided by accumulating in succession the number of bank notes P(n) treated for each part and unit, including the output levels from the optical sensors, the number of travelling bank notes, the rate of slanted bank notes, the rate of overlapped bank notes, and the rate of rejection evaluated in the data processing part 28. FIGS. 3*a* and 3*b* show formats entered into the memory 30 of diagnosed data, i.e. the amount of the change of the apparatus with the passage of time (the number of treated bank notes) and the frequency of occurrence information. FIG. 3*a* illustrates as described later, a format when the number of treated bank notes or the frequency of occurrence information is compared with the reference value for comparison, and the former exceeds the latter, wherein a flag is added to the number of treated bank notes or the frequency of occurrence information as an alarm. The flag is assumed in case the amount of the change with the passage of time, for example data information, exceeds the reference value for comparison. FIG. 3*b* illustrates a format when the diagnosed data does not exceed the reference value. Numeral 32 in FIG. 1 indicates a reference value storage part composed of a memory, etc., for storing the reference value $$\sum_{n=1}^{(nx-T)} Q(n)$$

of the number of treated bank notes for each part and unit, the reference value for comparison of the output levels from the optical sensors, the reference value for comparison of the rate of slanted bank notes, the reference value for the rate of overlapped bank notes, and the reference value for the rate of discriminated/rejected bank notes. These reference values are set as described previously, to have time to spare so as to permit the apparatus to be operated normally within a certain range (time) even if the diagnosed data exceeds the reference values. Numeral 34 is a prediction alarm display part for displaying a prediction alarm corresponding to parts or units under diagnosis. In particular, the prediction alarm display part 34 displays a prediction for all the optical sensors, those units including the rollers likely to cause slanted feed and overlapped feed, and for the judgement sensor 20. Numeral 36 indicates a keyboard for controlling the diagnosed data and the flag stored in the memory 30 and provides batch clear control wherein only diagnosed data including a flag added thereto and the flag are cleared while data not including a flag is not cleared, and furthermore provides single instruction control wherein single diagnosed data is cleared. The batch clear control is employed when a particular maintenance operation is finished during routine inspection, while the single instruction control is employed when exchanging any parts and units for reasons other than those due to the prediction alarm information. Moreover, the keyboard 36 is also employed for calling the display of a prediction alarm and for the alteration of the reference value. Numeral 38 indicates a comparator part for comparing the amount of the change of the apparatus with time (the number of treated bank notes) provided from the data collection part 26 via a control part 40 with reference value $$\sum_{n=1}^{(nx-T)} Q(n)$$

read from the reference value storage part 32 and furthermore for comparing the occurrence frequency information provided from the data collection part 28 via the control part 40 or a mean value among such frequency of occurrence information and the frequency of occurrence information read from the memory 30 with the reference value stored in the reference value storage part 32. The comparator part 38 furthermore stores the amount of the change of the apparatus with time (the amount of treated bank notes P(n)) or the frequency of occurrence information compared in conformity with the format shown in FIG. 3*b* when the amount of the change of the apparatus with time or the frequency of occurrence information does not exceed the reference value while storing the same information in the memory in conformity with the format of FIG. 3*a* when the same information is equal to or exceeds the reference value. Numeral 40 indicates the control part for controlling the above respective parts.

Figure 8:
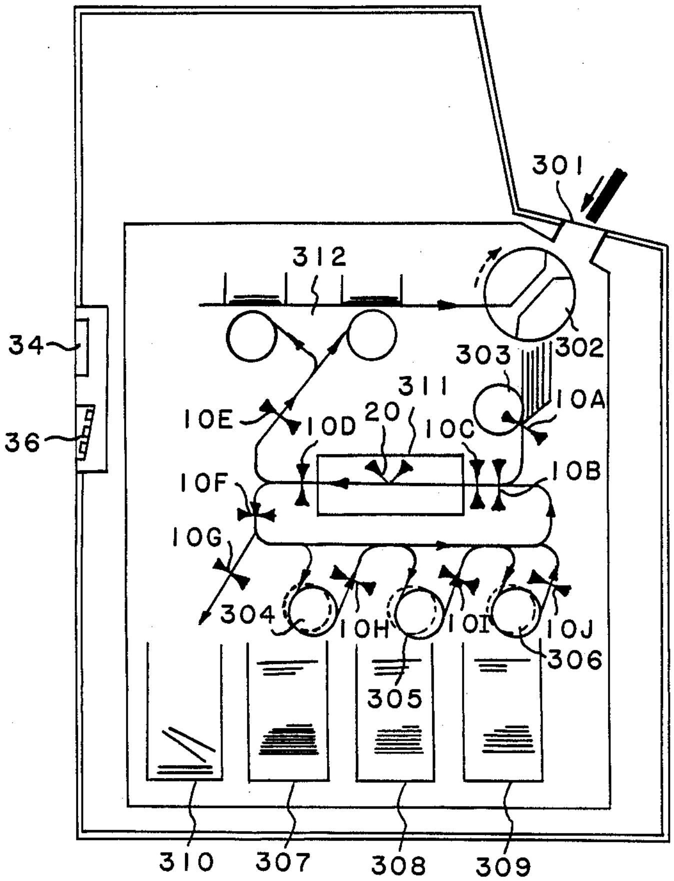
FIG. 8 is a schematic section showing the internal construction of a bank note depositing and dispensing machine according to the invention.

FIG. 8 shows a simplified internal construction of a bank note depositing and dispensing machine employed by the present invention. The travelling paths of the bank notes are indicated by solid lines. The numeral 301 is an opening in which the bank note are deposited and from which the bank notes are dispensed, 302 is a rotative travelling path of the bank notes which is rotated to feed the deposited bank notes toward a predetermined direction. A separation/delivery part 303 separates and delivers the deposited bank notes one by one. The numerals 304, 305 and 306 comprise a housing/delivery mechanism for transferring the bank notes into corresponding housing boxes 307, 308 and 309, and for separating and delivering the bank notes one by one to the housing boxes 307, 308 and 309. The numeral 310 is a housing box for rejected bank notes. A bank note discriminator 311 discriminates the genuineness or the falseness, stain and damage of the deposited bank notes. The numeral 312 divides the bank notes in accordance with the discriminating result and stocks temporarily the divided bank notes until they are fed onto the rotative travelling path 302. The bank notes are fed along the travelling paths within the machine in a direction indicated by arrows. The travelling sensors 10 shown in a block as a whole in FIG. 1 comprise travelling sensors 10A through 10J which are provided at various places along the travelling paths as shown and denoted 10A through 10J in FIG. 8. The travelling sensors 10A, 10D, 10E, 10F, 10G, 10H, 10I and 10J detect passage of the bank notes, 10B detects slanted feed of the bank notes and 10C detects overlapped feed of the bank notes.

FIG. 9 shows storing diagnosing data in the memory 30. In the addresses N1 through N29 of predetermined areas in the memory 30 corresponding to sensors disposed adjacent the parts and units in the machine, data of the amount of time change, the occurrence frequency of slanted feed, the occurrence frequency of overlapped feed, the output levels of each sensor and the like are stored in the storing format shown in FIG. 3. Also, the occurrence frequency of slanted feed and the occurrence frequency of overlapped feed can be detected for each bank note fed from the separation/delivery mechanism 303 and the housing/delivery mechanism 304, 305 and 306. For example, the data of the occurrence frequency of slanted feed indicates a bank note passed through the travelling sensor 10A after being fed from the separation/delivery part 303.

Figure 4:
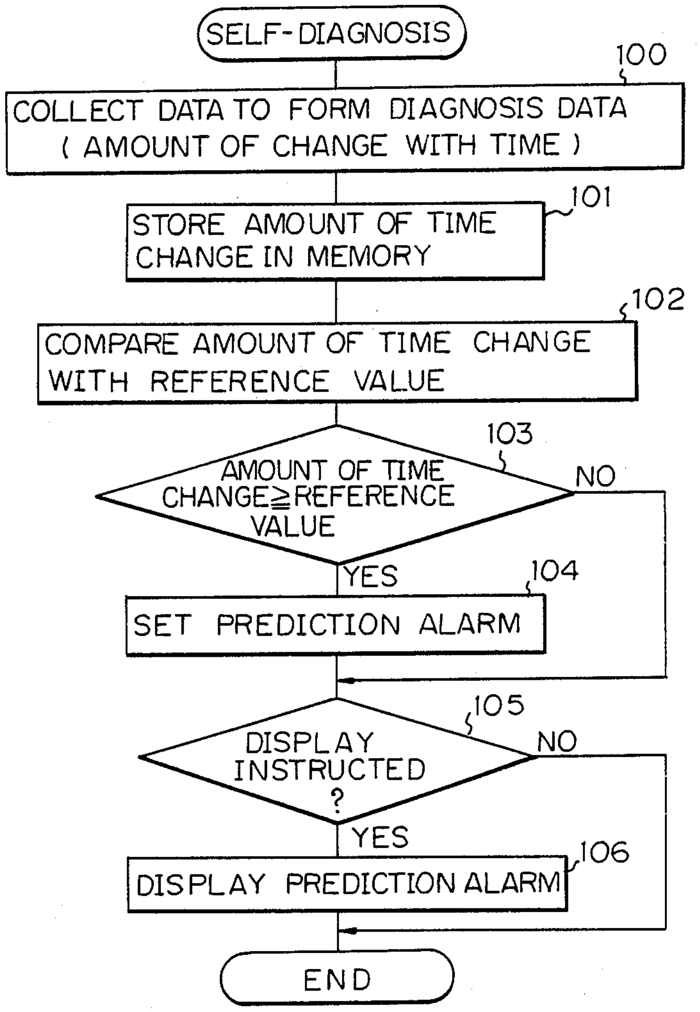
FIG. 4 is a flowchart illustrating an operating procedure of an embodiment of the present invention.

In succession, the self-diagnosis operation with the arrangement of FIG. 1 will be described for the following two cases: the amount of the change of the apparatus with time and the frequency of occurrence. First, a procedure for a diagnosis operation based on the amount of change of the apparatus with time is shown in FIG. 4. To collect data capable of diagnosing the operating state of the apparatus for forming diagnosis data, i.e. the amount of change with time (Step 100), the travelling bank note number detector part 14 detects a bank note travelling pulse issued from the travelling sensor 10 to supply a signal informing the data collection part 26 of the number of bank notes. The data collection part 26 temporarily stores the information of the number of treated bank notes for each part and unit to be diagnosed on the basis of the above signal, and transfers it such that it is added to the past information of the number of treated bank notes stored in the memory 30 when the particular operation is completed, for example when a series of the operations of the bank note depositing and dispensing machine to deposit or dispense bank notes is finished, or at every prescribed time interval. The control part 40 adds new treated bank not number information to the past treated bank note number information read from the memory 30 at the end of the above operation, and again stores the resulting value in the memory 30 as new past treated bank not number information, i.e. the new amount of the change of the apparatus with time from the start of the operation to the present time (Step 101). These new amounts of the changes with time are stored in the memory 30 at different addresses for each part and unit to be diagnosed as described before. For example, treated bank note number information yielded on the basis of the travelling sensor disposed in the vicinity of the separation roller and that yielded on the basis of the travelling sensor disposed in the discrimination part are stored at respectively different addresses. In addition, the control part 40 reads the reference value $$\sum_{n=1}^{(nx-T)} Q(n)$$

for each part 32 while reading the above new treated bank note number $$\sum_{n=1}^{n} P(n)$$

for each part and unit from the memory 30, and it compares both data in the comparator part 38 (Step 102). When the result satisfies the above equation (4), $$\sum_{n=1}^{n} P(n) \geqq \sum_{n=1}^{(nx-T)} Q(n),$$

the control part 40 enters $$\sum_{n=1}^{n} P(n)$$

in the memory 30 together with a flag, for example, such as date information in conformity with the format of FIG. 3*a* as it is needed to set a prediction alarm for the respective parts and units (Step 104). When the result does not satisfy the above equation, the control part 40 enters the total of the treated bank note numbers $$\sum_{n=1}^{n} P(n)$$

to that time in conformity with the format of FIG. 3*b*. Moreover, the procedure described above is adapted to once store the above treated bank note number in the memory 30 and read it for comparison with the reference value, but it may of course be adapted to calculate the total of the above treated bank note numbers before storing the above treated bank note number in the memory 30 and thereafter temporarily store the total value in a register, etc. included in the control part 40 to compare it with the reference value and thereafter enter the resulting value in the memory 30.

Thus, the memory 30 stores therein the treated bank note number as the amount of the change with time to that time for each part and unit. Furthermore, the memory 30, when the treated bank note number is equal to or more than the reference value, stores the treated bank note number as well as the flag added thereto.

In addition, the control part 40 judges the arrival of the date of routine inspection or the designation of key input to the keyboard 36 or the presence of a display request instruction provided due to the occurrence of a prediction alarm (Step 105), and furthermore, when there is any display instruction, it reads information stored in the memory 30 to retrieve parts and a unit associated with the treated bank note number including the flag added thereto for instructing the prediction alarm for the above parts and unit. The prediction alarm display part 34, upon receiving the above instructions, displays a prediction alarm for the corresponding parts and unit (Step 106). The maintenance man looking at the display of the prediction alarm is informed of a portion to be maintained and effects all maintenance associated with the display, and furthermore effects after the completion of the above maintenance, the batch clear control previously described via the keyboard 36. The control part 40 clears all the flags and the treated bank note number corresponding thereto stored in the memory 30. As a result, the parts and units for which flags and treated bank not number were cleared as described above are monitored anew in their treated bank note number, i.e., in the amount of time change.

In addition, when maintenance such as the replacement of any parts and unit for reasons other than the prediction alarm is effected, the maintenance man instructs through the keyboard 36 the parts and unit concerned to be subjected to the single instruction control. As a result, the treated bank note number associated with the concerned parts and unit and stored in the memory 30 is cleared.

In succession, the diagnosis operation by making use of the frequency of occurrence of improper operations will be described. This is basically the same as in the operation procedure when employing the amount of time change described above, but has a different feature from the above time change case with respect to employing the frequency information. Accordingly, there now will be described an example wherein frequency occurrence information associated with the operation of the apparatus per day is yielded and compared with the reference value.

Figures 1, 5, 5A:
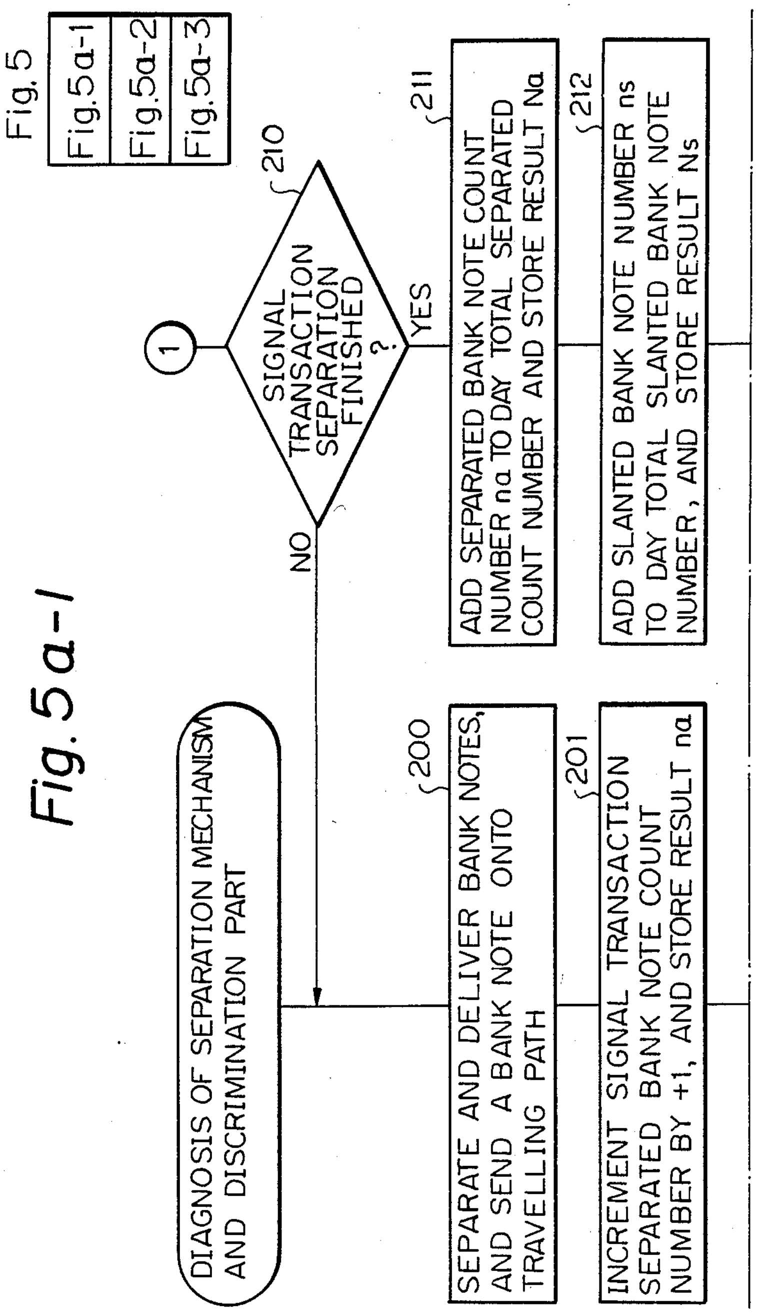
Figures 2, 5A:
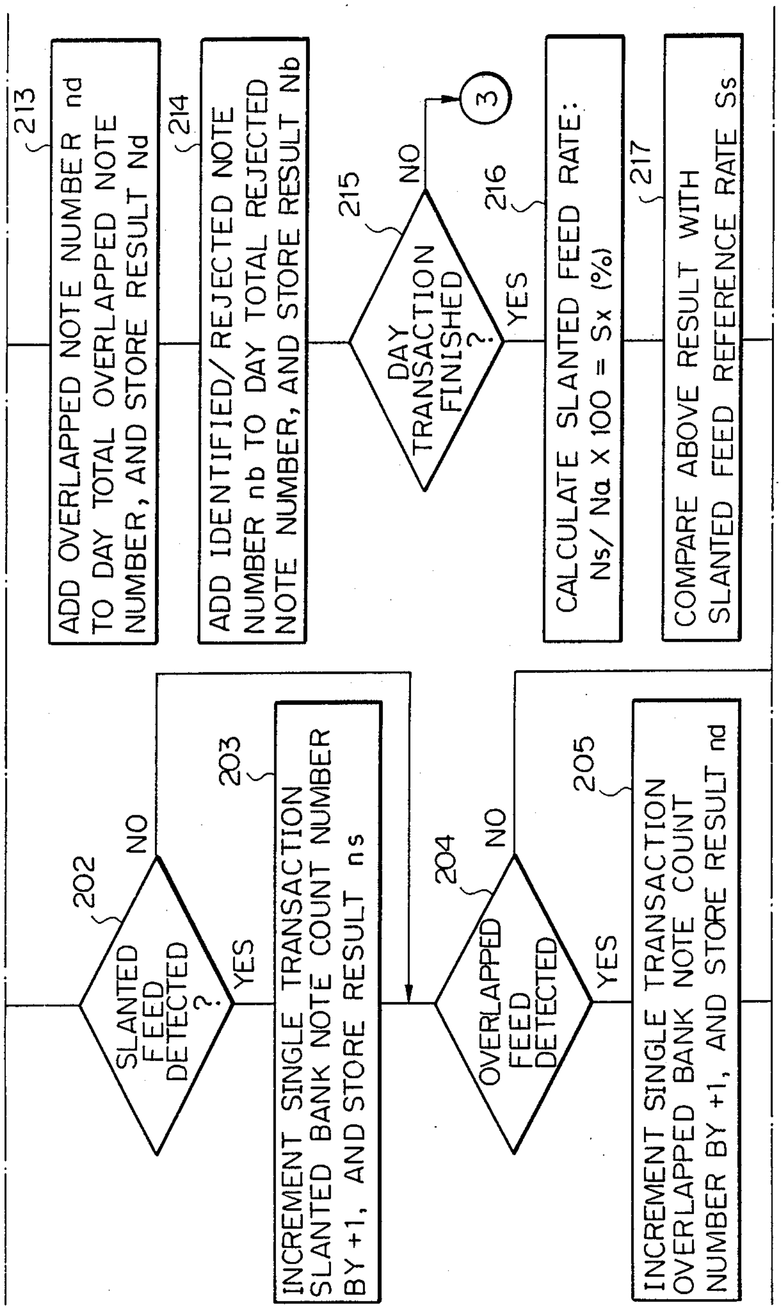
Figures 3, 5A:
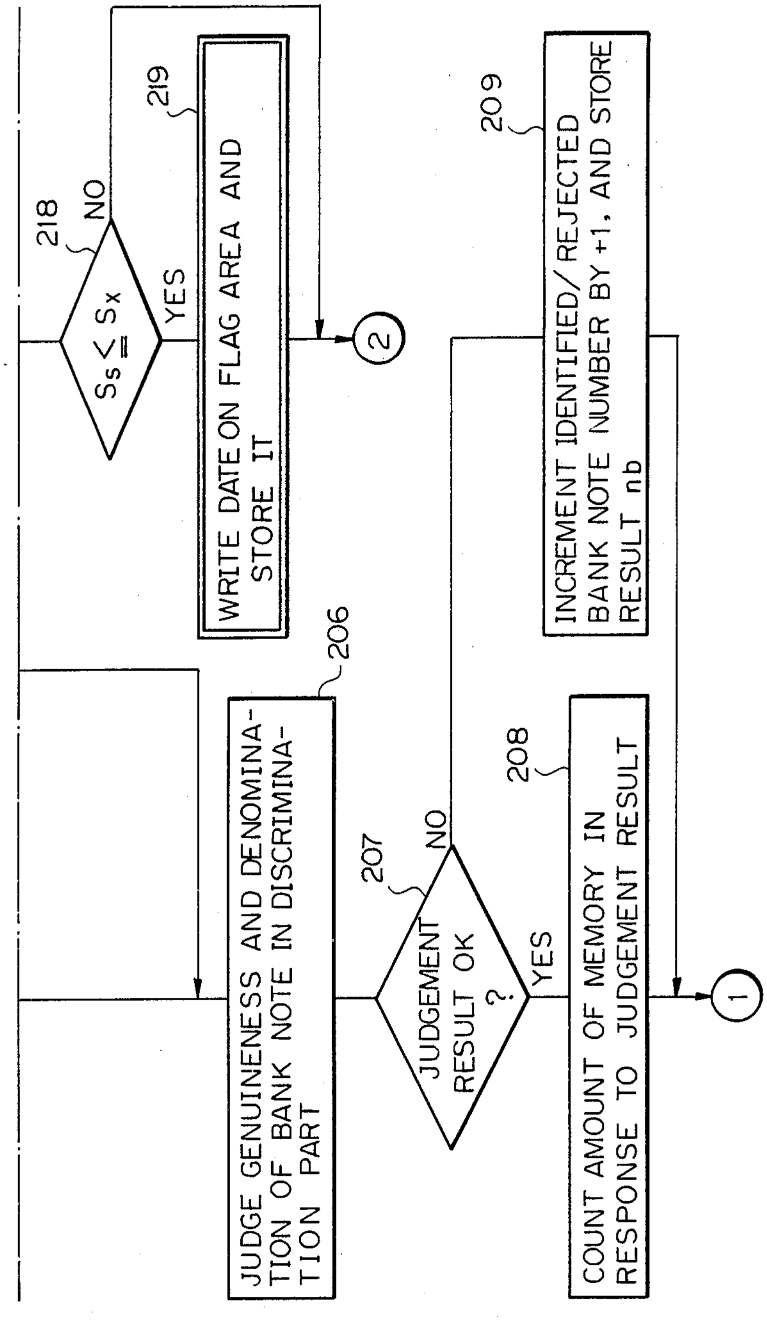

FIG. 5 illustrates a procedure of a diagnosis operation for the separation mechanism part and bank note identification part of the bank note depositing and dispensing machine by making use of the frequency of occurrence of improper operation thereof.

As shown in FIG. 5a–1 through a–3, steps 200 to 209 illustrate the operation for each one-blank note deposition during single depositing transactions. First, deposited bank notes are separated and delivered, whereby a single bank note is sent out onto the travelling path (Step 200). In addition, the separated (Travelling) bank note count number of the single transactions is counted up by +1 and the result na is temporarily stored in the data collection part 26 (Step 201). Then, the slanted feed detector part 16 detects slanted feed (Step 202). Such slanted feed detection is counted up by +1, and the result ns is temporarily stored in the data collection part 26 (Step 203). The operation advances to step 204. Unless such slanted feed is detected, the operation advances to the step 204. Subsequently, the overlapped feed detector part 18 detects overlapped feed (Step 204). When overlapped feed is detected, the bank note count number is counted up by +1, and the result nd is temporarily stored in the data collection part 26 (Step 205), and the operation advances to step 206. When no overlapped feed is detected, the operation advances to step 206. In succession, the discrimination part 22 discriminates the genuineness or falseness of the bank note concerned as well as the denomination thereof (Step 206). If the bank note is normal, the amount thereof is counted in response to the judgement result (Step 208). If it is abnormal, i.e. if it should be rejected, the identified rejected bank note number is counted up by +1, and the result nb is temporarily stored in the data collection part 26 (Step 209). The operation advances to step 210, and the next bank note is treated in the same manner.

Then, when the end of the separation for the respective single transactions is detected in the Step 210, the separated bank note number na is added to the day total separated bank note number, and the result Na is stored in the data collection part 26 (Step 211). In addition, the slanted bank note number ns is added to the day total slanted bank note number, and the result Ns is stored in the data collection part 26 (Step 212). Moreover, the overlapped bank note number nd is added to the day total overlapped bank note number, and the result Nd is stored in the data collection part 26 (Step 213). Furthermore, the identified/rejected bank note number nb is added to the day total rejected bank note number, and the result Nb is stored (Step 241).

Figure 5B:
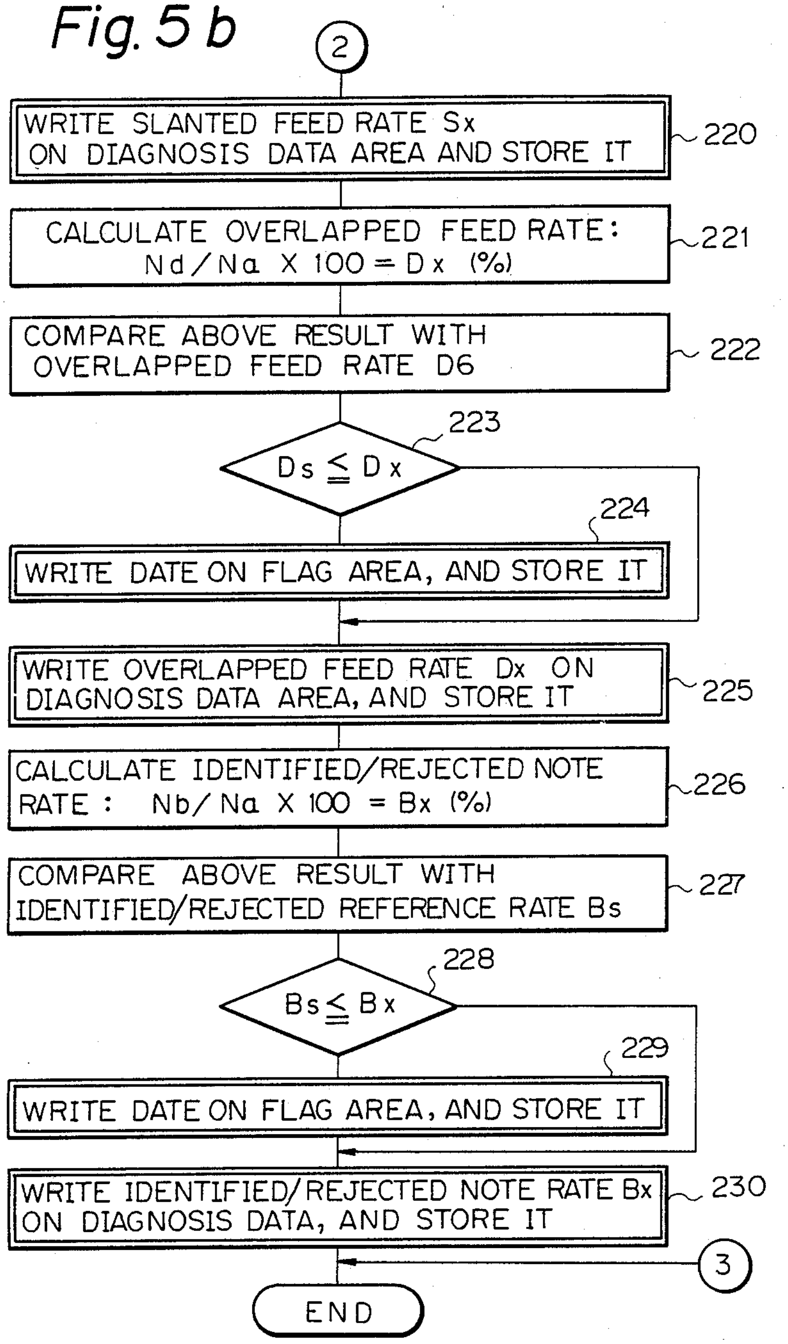

When the transactions of the day have ended, an end operation is effected in step 215 to end the transactions of the day. The data processing part 28 reads Na and Ns stored in the data collection part 26, and evaluates the rate of slanted feed $Sx(\%)=(Ns/Na)\times 100$ (Step 216). In succession, the comparator part 38 compares the rate of slanted feed Sx thus evaluated with the slanted feed reference rate Ss being the reference value stored in the reference value storage part 32 (Step 217). When a relation $Ss\leqq Sx$ is satisfied in Step 218, the operation advances to Step 219 to enter the flag area in the memory 30 as a flag in conformity with the format of FIG. 3a, and furthermore advances to Step 220 of FIG. 5b. When the relation $Ss\leqq Sx$ is not satisfied, the operation advances to Step 220. In Step 220, the slanted feed rate Sx is written in the diagnosis data area in conformity with the format of FIG. 3b and stored in the memory 30. Likewise, the overlapped feed rate Dx is evaluated with use of Nd and Na, compared with the overlapped feed reference rate Ds, and stored in the diagnosis data area in response to the diagnosed result (Steps 221 to 225). Likewise, the identified/rejected bank note rate Bx is evaluated with use of Nb and Na, compared with the identified/rejected bank note reference rate Bs, and stored in the diagnosis data area in response to the compared result (Step 230).

The apparatus is thus self-diagnosed. In addition, a display request instruction is issued due to, for example, the arrival of the routine inspection date or an instruction of a key input onto the keyboard 36 or generation of a prediction alarm, whereby the control part 40 automatically refers to the contents of the memory 30 to permit the prediction alarm display part 34 to display a prediction alarm for parts and a unit associated with frequency of occurrence information including a flag added thereto. A maintenance man looking at the display of the prediction alarm is informed of a portion to be maintained and effects required maintenance. With the completion of the maintenance, the maintenance man conducts batch clear control through the keyboard 36. The frequency of occurrence information not having an alarm flag added thereto is stored and held as it is.

Moreover, this example, when the slanted feed reference rate Ss is compared with the slanted feed rate Sx, may be adapted to employ the mean (e.g. running mean) value of the slanted feed rates within a certain period (e.g. one week) as the slanted feed reference rate Ss. This also applies to the overlapped feed rate and the identified/rejected bank note rate.

Any change with time and improper operation may be produced from sensors such as the travelling sensor 10 employed in obtaining the amount of time change and the frequency of occurrence information of improper operations as described above. Accordingly, diagnosis data from these sensors are also collected, and a prediction alarm is set provided there is the possibility of any breakdown of a part or unit in need of maintenance.

Figure 6A:
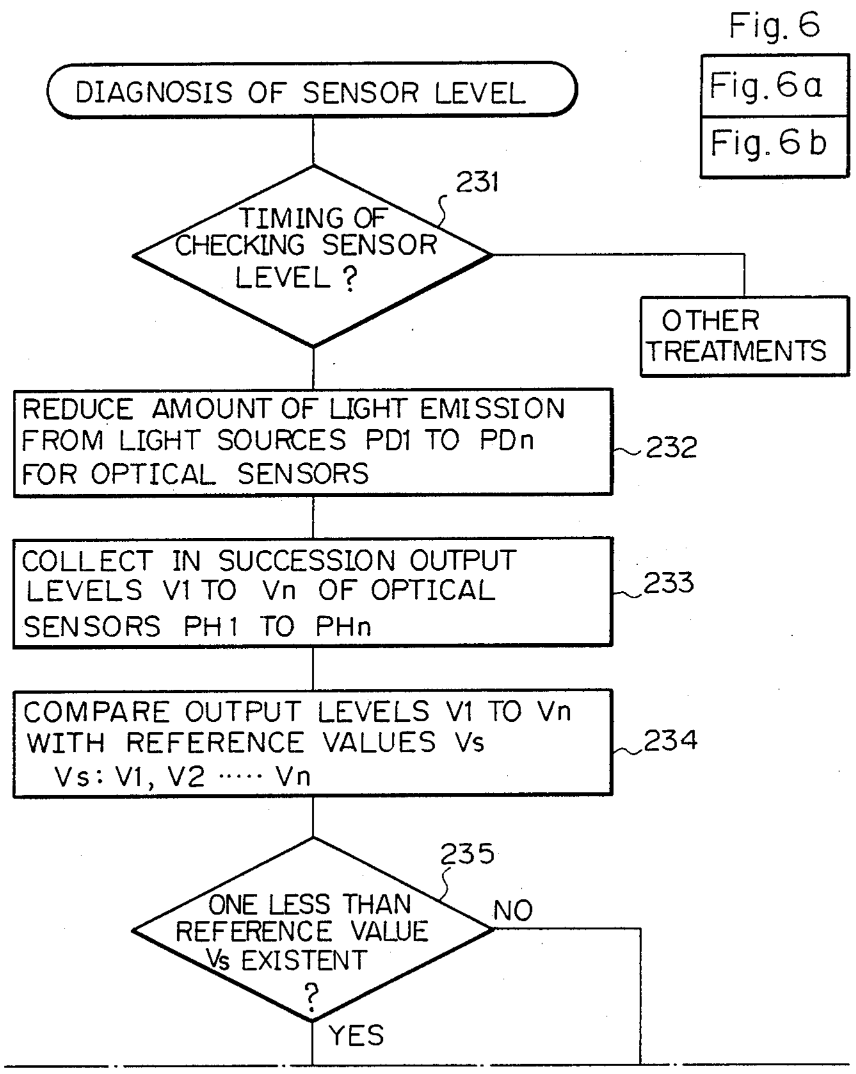
Figure 6B:
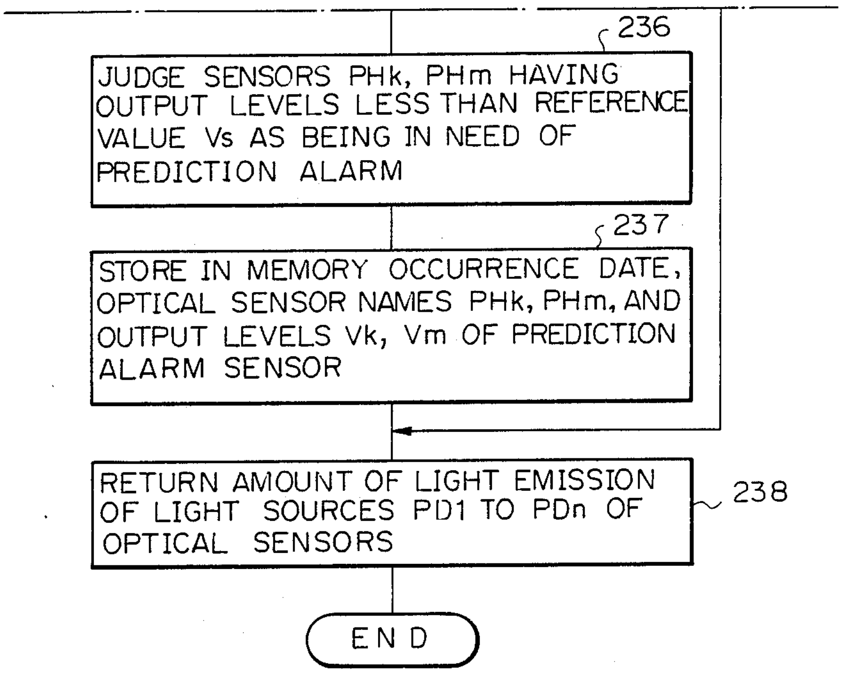

FIGS. 6a and 6b exemplarily show diagnosis for such a sensor with use of an output level thereof. As shown, when there is produced any timing for checking an output level of the sensor (Step 231), the amount of light emission of each of light sources PD1 through PDn of optical sensors is reduced to a prescribed level (Step 232). Then, the sensor level detector part 12 collects in succession the output levels V1 to Vn of the optical sensors PH1 to PHn, and stores them in the data collection part 26 (Step 233). In succession, the comparator part 38 compares the detected output levels V1 to Vn with the reference value Vs of the optical sensors stored in the reference value storage part 32 (Step 234). In Step 235, provided there is no output level less than the reference value Vs, the operation advances to Step 238 for returning to the original value the amount of light emission from each of the light sources PD1 to PDn of the optical sensors. Provided there is any output level less than the reference value Vs, the comparator part 38 judges the optical sensors PHk and PHm to be prediction alarm objects (Step 236), and enters the fault occurrence date as well as the sensor identifications PHk and PHm with respect to the above optical sensors on the flag area in the memory 30 while storing the output levels Vk and Vm on the diagnosis data area in the memory 30 (Step 237). The operation thereafter advances to Step 238. Hereupon, the above respective comparison operations are executed for example upon starting the apparatus on the next day.

Figure 10:
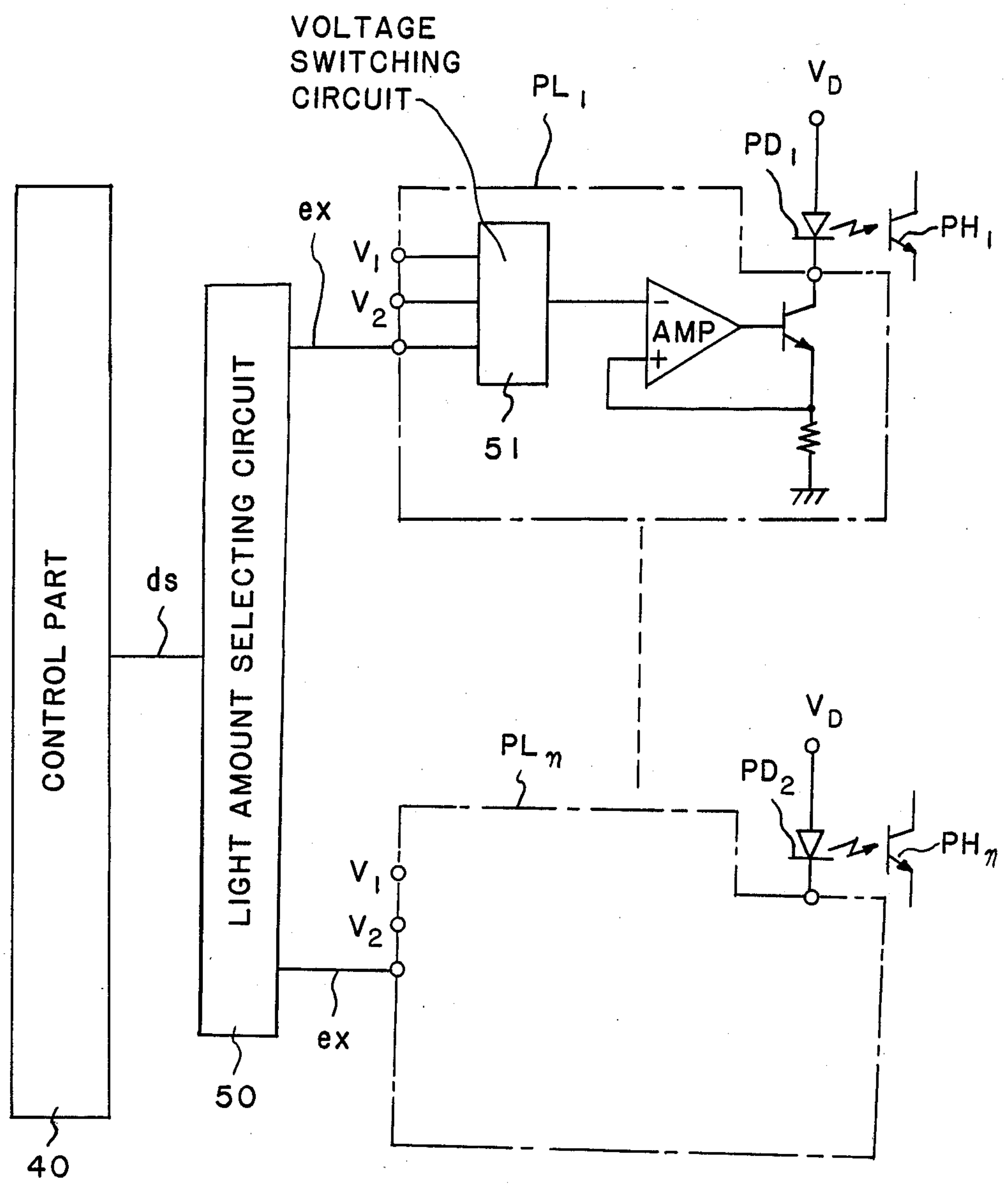
FIG. 10 is a circuit diagram according to a portion of the invention.

FIG. 10 shows a circuit for changing the amount of the light emitted from each of the light sources PG1 through PDn of the optical sensors. A light amount selecting circuit 50 gives a light amount switching signal ex to each light amount adjusting circuit PL1 through PLn when a control part 40 gives a light amount reduction signal ds to the light amount selecting circuit 50. Each one of the inputs of amplifiers AMP is switched from V1 to V2 (V1>V2) by voltage switching circuits 51 so that the amount of current flowing into the light sources PD1 through PDn is reduced which results in reduction of the amount of light.

In addition, when a display instruction is entered into the keyboard 36 as described above, the control part 40 refers to the contents stored in the memory 30 and accordingly displays on the prediction alarm display part 34 a prediction alarm for any of the optical sensors PHk and PHm corresponding to the diagnosis data including the flag added thereto. The maintenance man seeing this display is informed of an optical sensor in need of maintenance, effects cleaning or exchange of the sensor, and furthermore effects the batch clear control on the keyboard 36.

As described above in detail, according to the present embodiment, the occurrence of any breakdown of any part or unit in need of maintenance is predicted on the basis of the amount of the change with time and the frequency of occurrence of improper operation to permit the trouble factor concerned to be eliminated before the apparatus is actually broken down due to such trouble, thereby improving the operating efficiency and reliability of the apparatus. Furthermore, the self-diagnosis method of the present invention can be applied also to portions (e.g. a card reader and a card conveyance mechanism in the automatic bank note transaction apparatus) other than the portions described above and apparatuses other than the automatic bank note transaction apparatus.

Figure 7A:
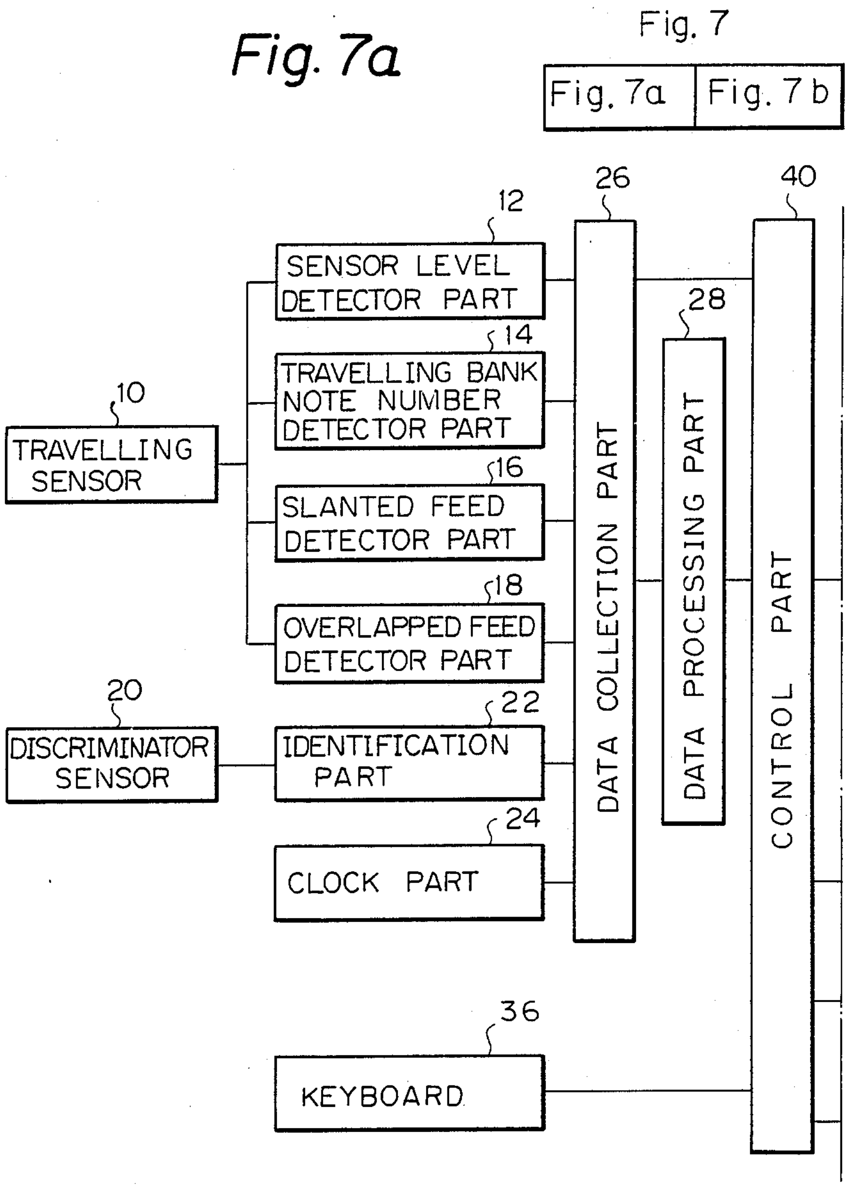
Figure 7B:
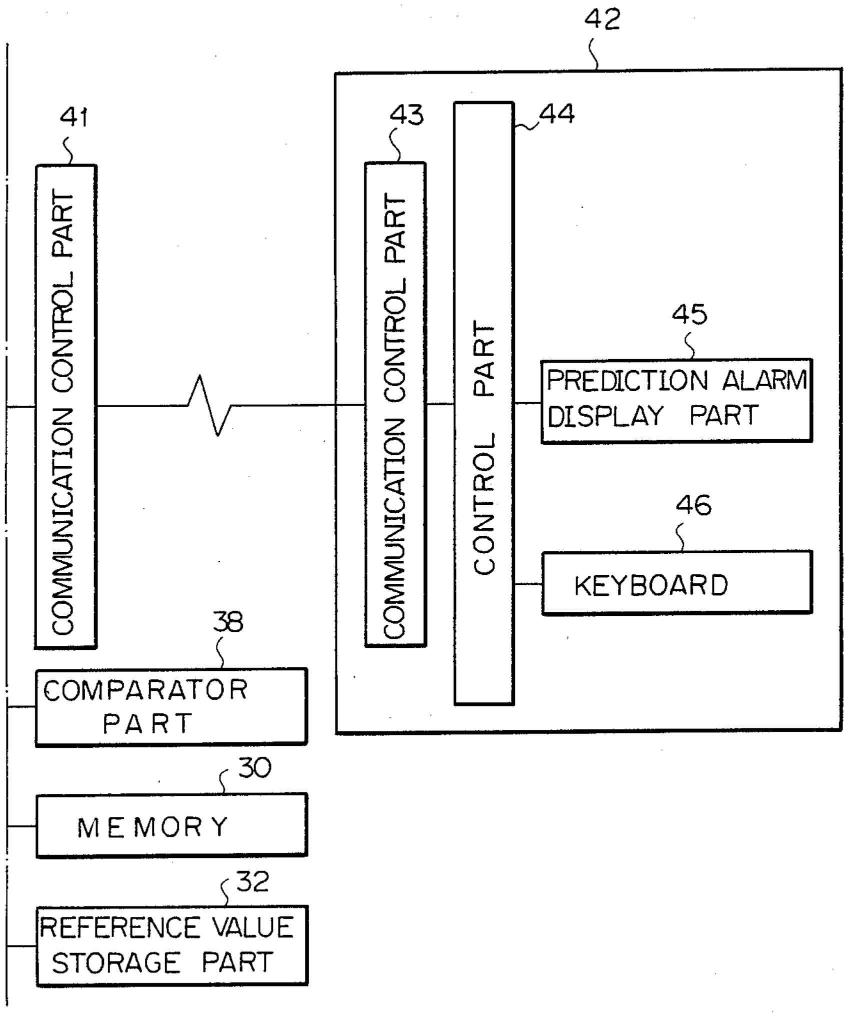

In addition, although in the above embodiment a device for preventing any potential trouble from occurring is adapted to provide a prediction alarm, other variations may be employed. FIG. 7 exemplarily illustrates such a modified system wherein the information stored in the memory 30 in the above embodiment is transmitted to a remote monitor device 42 installed at a remote place via control part 40 and a communication control part 41 for preventing any trouble from being produced at the remote place. The remote monitor unit 42 includes a communication control part 43 for controlling the transmission and reception of data to and from the control part 40 through a transmission line, a remote control part 44 for controlling the overall operation, a prediction alarm display part 45 for displaying a prediction alarm for each part and unit, and a keyboard 46 for use in the display of a prediction alarm and instructions such as alternation of the reference value.

For example, when the display of a prediction alarm is designated from the keyboard 46, this instruction is transmitted from the remote monitor device 42 to the control part 40 of the apparatus, whereby the control part 40 refers to the contents of the memory 30, similar to an instruction from the keyboard 36, and transmits information indicative of parts and a unit corresponding to diagnosis data including a flag added thereto to the remote monitor device 42. In the remote monitor device 42, the remote control part 44 interprets the above information and provides a display indicative of parts and a unit in need of maintenance on the prediction alarm display part 45. The remote monitor device has the advantage in that it can provide information needed to prevent any trouble from being produced even if a maintenance man is not at the location of the apparatus in question.

Although certain preferred embodiments have been shown and described, it should be understood that many changes and modifications may be made thereto without departing from the scope of the appended claims.

We claim:

1. A method of self-diagnosis of a need for maintenance of parts and units of a bank note depositing and dispensing machine, wherein bank notes are accepted for deposit and are dispensed by said machine during which said parts and units perform respective tasks in connection with depositing and dispensing of said bank notes and change over time as a function of performance of such tasks, said method comprising:

(a) collecting respective number data, representative of a number of travelling bank notes in connection with which said tasks are performed by each said part and unit and corresponding to an amount of change over time of each said part and unit, by means of a plurality of sensors provided along paths of travel of the bank notes in the bank note depositing and dispensing machine;

(b) storing in a memory the thus collected number data corresponding to each said part and unit after adding said collected number data to previously collected number data representative of a number of bank notes previously detected by said sensors for each said part and unit;

(c) comparing the collected number data stored in said memory with a reference value previously defined and stored for each said part and unit;

(d) storing prediction alarm data in said memory for each said part and unit if said collected number data corresponding thereto is equal to or exceeds said reference value corresponding thereto;

(e) reading the thus stored prediction alarm data in said memory when a request instruction therefor is issued;

(f) diagnosing whether said prediction alarm data is provided in the thus read data; and (g) displaying a prediction alarm representative of a presence of said prediction alarm data in said read data as an indication of a need for maintenance of each said part and unit.

2. The method according to claim 1, wherein said collected number data representative of the number of travelling bank notes is again stored in said memory when said collected number data does not exceed said reference value after comparison of said reference value with said collected number data.

3. The method according to claim 1, further comprising clearing said prediction alarm data and said collected number data for a respective part and unit from said memory by a keyboard, and continuing to store in said memory respective number data for each said part and unit representative of the number of bank notes treated for which said prediction alarm data has not been stored.

4. The method according to claim 1, wherein the request instruction is given to the machine by means of a remote monitor device having prediction alarm display means for displaying said prediction alarm and request instruction means for requesting said instruction to read said stored data in said memory.

5. A method of self-diagnosis of a need for maintenance of separation/delivery parts of a bank note depositing and dispensing machine, wherein bank notes are accepted for deposit and are dispensed by said machine during which said separation/delivery parts of said machine may cause slanted feed and may cause overlapped feed of bank notes as a function of the need for maintenance of said separation/delivery parts, said method comprising:

(a) counting a number of occurrences of slanted feed and overlapped feed of bank notes, and a number of separations/deliveries of bank notes, respectively, for a predetermined period, for each said separation/delivery part of said machine;

(b) calculating a frequency of occurrence of said slanted feed and overlapped feed of said bank notes by dividing said number of occurrences by said number of separations/deliveries of bank notes;

(c) storing the thus calculated frequency of occurrence of slanted feed and overlapped feed for each separation/delivery part of the machine in a memory;

(d) comparing said frequency of occurrence of slanted feed and overlapped feed of bank notes stored in said memory with a respective predetermined reference value for each said separation/delivery part;

(e) storing prediction alarm data in said memory for each said separation/delivery part when said frequency of occurrence corresponding thereto is equal to or exceeds the said respective reference value;

(f) reading the thus stored prediction alarm data when a request instruction therefor is issued;

(g) diagnosing whether said prediction alarm data is provided in the thus read data; and (h) providing a prediction alarm representative of a presence of said prediction alarm data in said read data as an indication of the need for maintenance of each said separation/delivery part.

6. The method according to claim 5, wherein the request instruction is given to the machine by means of a remote monitor device having prediction alarm display means for displaying said prediction alarm and request instruction means for requesting said instruction to read said stored data in said memory.

7. A method of self-diagnosis of a need for maintenance of each of a plurality of optical sensors provided along paths of travel in a bank note depositing and dispensing machine, during use of which machine levels of output of said sensors are subject to change, said method comprising:

(a) reducing an amount of current flowing into a respective light source of each said optical sensor compared to current flowing thereto during other times so that light emission from said light source is reduced during a predetermined time of diagnosis of each said light source;

(b) detecting an output level of each said optical sensor at said predetermined time of diagnosis;

(c) storing in a memory output level data indicative of the thus detected output level for each said optical sensor;

(d) comparing the thus stored output level data for each optical sensor with a reference value previously defined and stored in said memory;

(e) determining any said optical sensor output level of any said optical sensor that does not exceed said reference value, as an indication of optical sensors in need of maintenance;

(f) storing prediction alarm data in said memory for each of said optical sensors in need of maintenance;

(g) reading said stored prediction alarm data when a request instruction therefor is input from a keyboard;

(h) diagnosing whether said prediction alarm data is provided in the thus read data; and (i) displaying a prediction alarm representative of a presence of said prediction alarm data in said read data as an indication of each of said optical sensors in need of maintenance.

8. The method according to claim 7, wherein the request instruction is given to the machine by means of a remote monitor device having prediction alarm display means for displaying said prediction alarm and request instruction means for requesting said instruction to read said stored data in said memory.

9. In a bank note depositing and dispensing machine, wherein bank notes are accepted for deposit and are dispensed, during which parts and units of the machine perform respective tasks in connection with depositing and dispensing of the bank notes and change over time as a function of performance of such tasks, the improvement wherein said machine includes means for self-diagnosis of a need for maintenance of said parts and units as a result of such change, said self-diagnosis means comprising:

(a) means for collecting respective number data representative of a number of bank notes in connection with which said data are performed by each said part and unit corresponding to an amount of change over time of each said part and unit, said collecting means comprising a plurality of sensors provided along parts of travel of the bank notes in said machine;

(b) means for storing in a memory the thus collected number data corresponding to each said part and unit after adding said collected number data to previously collected number data representative of a number of bank notes previously detected by said sensors for each said part and unit;

(c) means for comparing said collected number data stored in said memory with a reference value previously defined and stored for each said part and unit;

(d) means for storing prediction alarm data in said memory for each said part and unit if said collected number data corresponding thereto is equal to or exceeds said reference value corresponding thereto;

(e) means for reading the thus stored prediction alarm data in said memory when a request instruction therefor is issued;

(f) means for diagnosing whether or not said prediction alarm data is provided in the thus read data; and (g) means for displaying a prediction alarm representative of a presence of said prediction alarm data in said read data as an indication of the need for maintenance of each said part and unit.

10. The improvement according to claim 9, further comprising means for again storing said collected number data in said memory when said collected number data does not exceed said reference value after comparison of said reference value with said collected number data.

11. The improvement according to claim 9, further comprising keyboard means for clearing said prediction alarm data and said collected number data for a respective said part and unit from said memory, and continuing to store in said memory the respective said number data for each said part and unit representative of the number of bank notes treated for which said prediction alarm data has not been stored.

12. The improvement according to claim 9, further comprising remote monitor means for providing said request instruction, said remote monitor means including prediction alarm display means for displaying said prediction alarm and request instruction means for requesting said instruction to read said stored data in said memory.

13. In a bank note depositing and dispensing machine, wherein bank notes are accepted for deposit and are dispensed, during which separation/delivery parts of said machine may cause slanted feed and may cause overlapped feed of bank notes as a function of a need for maintenance of said separation/delivery parts, the improvement wherein said machine includes means for self-diagnosis of said need for maintenance of said separation/delivery parts, said self-diagnosis means comprising:

(a) means for counting a number of occurrences of slanted feed and overlapped feed of bank notes, and a number of separation/deliveries of bank notes, respectively, for a predetermined period, for each said separation/delivery part of said machine;

(b) means for calculating a frequency of occurrence of slanted feed and overlapped feed of the bank notes by dividing said number of occurrences by said number of separations/deliveries of bank notes;

(c) means for storing said frequency of occurrence of slanted feed and overlapped feed for each said separation/delivery part of said machine in a memory;

(d) means for comparing said frequency of occurrence of slanted feed and overlapped feed of bank notes stored in said memory with a respective predetermined reference value for each said separation/delivery part;

(e) means for storing prediction alarm data in said memory for each separation/delivery part when said frequency of occurrence corresponding thereto is equal to or exceeds the said respective reference value;

(f) means for reading the thus stored prediction alarm data when a request instruction therefor is issued;

(g) means for diagnosing whether or not said prediction alarm data is provided in the thus read data; and (h) means for displaying a prediction alarm representative of a presence of said prediction alarm data in said read data an as indication of the need for maintenance of each said separation/delivery part.

14. The improvement according to claim 13, further comprising remote monitor means for providing said request instruction, said remote monitor means including prediction alarm display means for displaying said prediction alarm and request instruction means for requesting said instruction to read said stored data in said memory.

15. In a bank note depositing and dispensing machine, wherein bank notes are accepted for deposit and are dispensed, said machine including a plurality of optical sensors provided along paths of travel in said machine, during use of which levels of output of said sensors are subject to change, the improvement wherein said machine includes means for self-diagnosis of any such change in said levels of output indicative of a need for maintenance of each of said sensors, said means comprising:

(a) means for reducing an amount of current flowing into a respective light source of each said optical sensor compared to current flowing thereto during other times so that the amount of light emission from said light source is reduced during a predetermined time of diagnosis of each said light source;

(b) means for detecting an output level of each said optical sensor at said predetermined time of diagnosis;

(c) means for storing in a memory output level data indicative of the thus detected output level for each said optical sensor;

(d) means for comparing the thus stored output level data for each said optical sensor with a reference value previously defined and stored in said memory;

(e) means for determining any said optical sensor output level of any said optical sensor that does not exceed said reference value, as an indication of optical sensors in need of maintenance;

(f) means for storing prediction alarm data in said memory for each of said optical sensors in need of maintenance;

(g) means for reading said stored prediction alarm data when a request instruction therefor is input from a keyboard;

(h) means for diagnosing whether said prediction alarm data is provided in the thus read data; and (i) means for displaying a prediction alarm representative of a presence of said prediction alarm data in said read data as an indication of each of said optical sensors in need of maintenance.

16. The improvement according to claim 15, further comprising remote monitor means for providing said request instruction, said remote monitor means including prediction alarm display means for displaying said prediction alarm and request instruction means for requesting said instruction to read said stored data in said memory.

* * * * *